Nov. 3, 1970                     R. KINGSLAKE                     3,537,774
         PHOTOGRAPHIC OBJECTIVE OF THE GAUSS TYPE HAVING TWO
                        AIRSPACED NEGATIVE DOUBLETS
                           Filed April 2, 1969

RUDOLF KINGSLAKE
INVENTOR.

BY *William F. Delaney Jr.*

*Robert W. Hampton*
ATTORNEYS

United States Patent Office

3,537,774
Patented Nov. 3, 1970

3,537,774
PHOTOGRAPHIC OBJECTIVE OF THE GAUSS TYPE HAVING TWO AIRSPACED NEGATIVE DOUBLETS
Rudolf Kingslake, Rochester, N.Y., assignor to Eastman Kodak Company, Rochester, N.Y., a corporation of New Jersey
Filed Apr. 2, 1969, Ser. No. 812,837
Int. Cl. G02b 9/36, 9/62
U.S. Cl. 350—215      4 Claims

ABSTRACT OF THE DISCLOSURE

Four-component objectives of the Gauss type adapted for printing at unit magnification in monochromatic light, comprising two inner airspaced doublets on opposite sides of a centrally located diaphragm and two outer positive components.

BACKGROUND OF THE INVENTION

This invention relates to seven-element, four-component objectives of the modified Gauss type which are well corrected at high apertures and have high resolution qualities such as required for high-resolution printing at unit magnification. More particularly, this invention relates to objectives comprising two inner airspaced doublets on opposite sides of a centrally located diaphragm, and two outer positive components.

Objective lenses used for printing must be exceptionally well corrected for all aberrations and should be capable of high resolution. One reason for these high quality requirements for printing lenses is the fact that slight defects in the object can be exaggerated by aberrations in the objective and may even cause the images of fine structures to fuse. For some applications the optical precision of such lenses can be improved by specifically designing the lens for use in monochromatic light for printing on a film which is sensitive to that particular wavelength.

Many variations of Gauss-type lenses are known in the prior art, including such objectives having two inner negative airspaced doublets. U.S. Pats. 2,645,155 and 2,646,721 disclose examples of such lenses. However, the lenses according to the present invention provide increased resolution and optical quality for precision printing at unit magnification using high relative apertures.

SUMMARY OF THE INVENTION

It is an object of this invention to provide four-component objectives of the modified Gauss type which are exceptionally well corrected and have high resolution quality at high apertures for printing at unit magnification.

It is another object of this invention to provide such objective lenses which are well corrected for spherical aberration, coma, astigmatism, field curvature and distortion, and which are particularly adapted for printing in monochromatic light to eliminate chromatic aberration problems.

These and other objects are accomplished according to the disclosed embodiments of the present invention by seven-element, four-component modified Gauss lenses comprising two outer positive components and two inner negative airspaced components, in which the airspace of each inner negative component is highly negatively refractive, in which the negative elements are exceptionally thick, and in which the outer positive components are both biconvex.

The inner negative components are both doublets comprising an inner biconcave element and an outer meniscus positive element concave toward the negative element. The inner negative doublets define negatively refracting airspaces wider than 2% of the focal length of the objective. The negative elements exceed 8.5% of the focal length in thickness. All of the elements have indexes of refraction greater than 1.60, and the positive elements all have indexes of refraction greater than 1.65. The high indexes and the thicknesses of the negative elements simplify the correction of aberrations, since they reduce the surface curvatures required for such corrections.

DESCRIPTION OF THE PREFERRED EMBODIMENT

Figure 1:
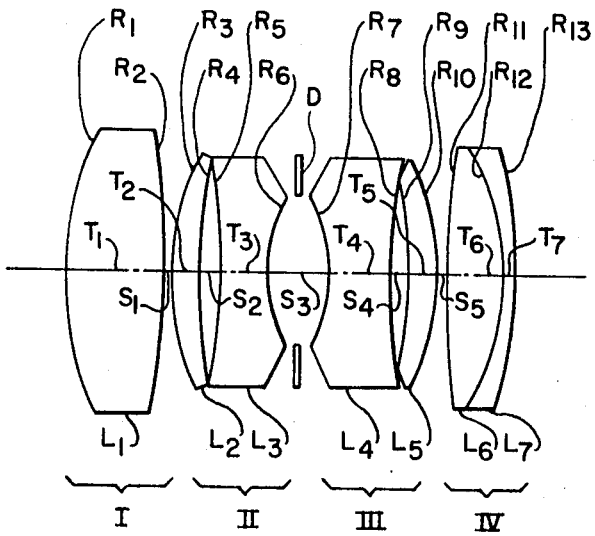
FIG. 1 is a sectional view of an objective lens according to the invention.

The lens in FIG. 1 comprises four components, namely an outer pair of positive components I and IV, and an inner pair of negative components II and III with a centrally located diaphragm D. Component I is a simple biconvex positive element $L_1$. Components II and III both comprise an inner biconcave element, $L_3$ and $L_4$ respectively, next to the diaphragm, and an outer meniscus positive element, $L_2$ and $L_5$ respectively.

Numerical data for constructing objectives according to this invention as outlined above and having an equivalent focal length of 100 mm. are given in the following table of parameter ranges, in which the lens elements are numbered from front to rear, N is the index of refraction of each lens element for the D line of the spectrum, V is the index of dispersion, and R, T and S refer respectively to the radii of curvature of the lens surfaces, the thicknesses of the lens elements and the airspaces between the lens elements, numbered by subscript from front to rear:

| Elements | N | V | Radii (mm.) | Thicknesses and spacings (mm.) |
|---|---|---|---|---|
| $L_1$ | 1.71–1.76 | 47–54 | $R_1$=65–77<br>$R_2$=−145–220 | $T_1$=12–18<br>$S_1$=.1–3 |
| $L_2$ | 1.65–1.71 | 53–59 | $R_3$=45–50<br>$R_4$=100–160 | $T_2$=4–7<br>$S_2$=2–5 |
| $L_3$ | 1.67–1.70 | 30–32 | $R_5$=−250–1,000<br>$R_6$=32–34 | $T_3$=10–11<br>$S_3$=10–12 |
| $L_4$ | 1.61–1.63 | 31–37 | $R_7$=−33–38<br>$R_8$=240–310 | $T_4$=8–13<br>$S_4$=2–8 |
| $L_5$ | 1.69–1.71 | 56–57 | $R_9$=−130–155<br>$R_{10}$=−50–52 | $T_5$=4.5–5<br>$S_5$=.1–2 |
| $L_6$ | 1.68–1.72 | 48–54 | $R_{11}$=130–210<br>$R_{12}$=−35–38 | $T_6$=10–11<br>$T_7$=1–6 |
| $L_7$ | 1.61–1.64 | 45–60 | $R_{13}$=−70–115 | |

Preferred embodiments of the objective lenses according to the invention having equivalent focal lengths of 100 mm. are given in the three examples below:

EXAMPLE I

| Elements | N | V | Radii (mm.) | Thicknesses and spacings (mm.) |
|---|---|---|---|---|
| $L_1$ | 1.75510 | 47.2 | $R_1=66.300$<br>$R_2=-192.96$ | $T_1=17.42$<br>$S_1=2.23$ |
| $L_2$ | 1.65820 | 57.2 | $R_3=46.049$<br>$R_4=108.97$ | $T_2=4.70$<br>$S_2=2.36$ |
| $L_3$ | 1.69873 | 30.1 | $R_5=-352.51$<br>$R_6=33.510$ | $T_3=10.06$<br>$S_3=10.92$ |
| $L_4$ | 1.61633 | 31.0 | $R_7=-33.285$<br>$R_8=252.60$ | $T_4=12.15$<br>$S_4=2.18$ |
| $L_5$ | 1.69680 | 56.2 | $R_9=-133.01$<br>$R_{10}=-50.695$ | $T_5=4.63$<br>$S_5=.51$ |
| $L_6$ | 1.68235 | 48.2 | $R_{11}=138.25$<br>$R_{12}=-37.751$ | $T_6=10.95$ |
| $L_7$ | 1.62032 | 60.3 | $R_{13}=-73.381$ | $T_7=1.41$ |

The objective in Example I is particularly corrected for use in blue light at a wavelength of 435.8 mm., in which it can resolve in excess of 400 lines per mm. throughout the image area. In addition, the lens is achromatized for use in green and blue light to permit image alignment in green light as well as high level performance in blue light.

Figures 2, 3:
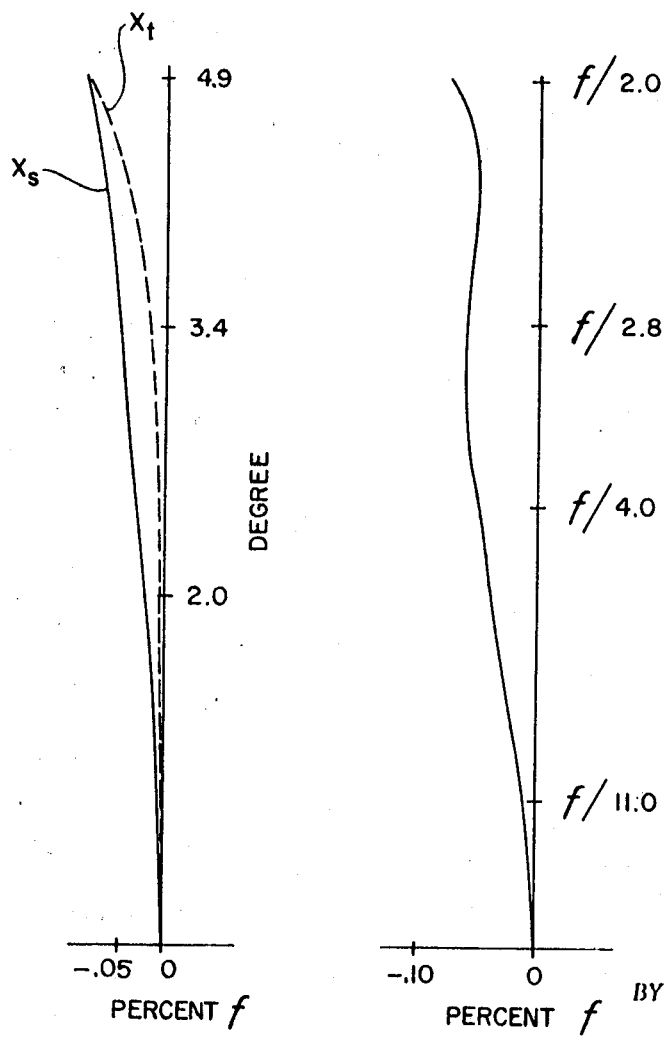
FIG. 2 is a curve showing spherical aberration for the G line of the spectrum for the lens in Example I below.
FIG. 3 is a curve showing sagittal and tangential astigmatism for the lens in Example I in a solid line and a dashed line respectively.

As seen in FIGS. 2 and 3, the objective described in Example I is corrected to such a degree that spherical aberration for the G line of the spectrum is less than .08% of the focal length of the objective, and the sagittal and tangential fields also vary less than .08% of the focal length. Distortion at the edges of the field is 0.004%.

EXAMPLE II

| Elements | N | V | Radii (mm.) | Thicknesses and spacings (mm.) |
|---|---|---|---|---|
| $L_1$ | 1.73400 | 51.0 | $R_1=76.578$<br>$R_2=-215.56$ | $T_1=14.87$<br>$S_1=.33$ |
| $L_2$ | 1.65100 | 58.4 | $R_3=45.793$<br>$R_4=101.59$ | $T_2=6.27$<br>$S_2=4.49$ |
| $L_3$ | 1.68900 | 30.9 | $R_5=-996.05$<br>$R_6=33.713$ | $T_3=10.81$<br>$S_3=10.90$ |
| $L_4$ | 1.62100 | 36.2 | $R_7=-35.854$<br>$R_8=242.31$ | $T_4=9.84$<br>$S_4=2.05$ |
| $L_5$ | 1.69680 | 56.2 | $R_9=-153.34$<br>$R_{10}=-51.400$ | $T_5=4.68$<br>$S_5=.15$ |
| $L_6$ | 1.71987 | 50.4 | $R_{11}=135.43$<br>$R_{12}=-36.399$ | $T_6=10.88$ |
| $L_7$ | 1.61090 | 57.2 | $R_{13}=-93.522$ | $T_7=5.19$ |

EXAMPLE III

| Elements | N | V | Radii (mm.) | Thicknesses and spacings (mm.) |
|---|---|---|---|---|
| $L_1$ | 1.71289 | 53.8 | $R_1=65.1067$<br>$R_2=-146.65$ | $T_1=12.84$<br>$S_1=.14$ |
| $L_2$ | 1.71289 | 53.8 | $R_3=49.156$<br>$R_4=153.739$ | $T_2=5.12$<br>$S_2=2.17$ |
| $L_3$ | 1.67250 | 32.0 | $R_5=-250.53$<br>$R_6=32.111$ | $T_3=10.72$<br>$S_3=11.34$ |
| $L_4$ | 1.61700 | 36.6 | $R_7=-37.637$<br>$R_8=308.53$ | $T_4=8.55$<br>$S_4=7.57$ |
| $L_5$ | 1.69680 | 56.2 | $R_9=-139.36$<br>$R_{10}=-51.245$ | $T_5=4.76$<br>$S_5=1.74$ |
| $L_6$ | 1.71289 | 53.8 | $R_{11}=203.18$<br>$R_{12}=-35.499$ | $T_6=11.00$ |
| $L_7$ | 1.63918 | 45.2 | $R_{13}=-111.72$ | $T_7=1.38$ |

The above lenses in the above Examples II and III are particularly corrected for use in G and e light respectively to a degree similar to the corrections of the lens in Example I.

The invention has been described in detail with particular reference to preferred embodiments thereof, but it will be understood that variations and modifications can be effected within the spirit and scope of the invention.

I claim:

1. An optical objective comprising in spaced optical alignment two inner negative components on opposite sides of a centrally located diaphragm, and two other positive components, said inner components each including an inner biconcave element airspaced from an outer meniscus element concave toward the diaphragm, said front positive component being a simple biconvex element, said rear positive component being a biconvex doublet with a cemented surface concave toward the diaphragm, wherein the elements are constructed substantially according to the following ranges of parameters for the lens at an equivalent focal length of 100 mm. in which the lens elements are numbered from the front, N is the index of refraction for the D line of the spectrum, and R, T S refer respectively to the radii of curvature of the lens surfaces, the axial thicknesses of the lens elements and the axial spacings between the lens elements numbered by subscript from front to rear:

| Elements | N | Radii (mm.) | Thicknesses and spacings (mm.) |
|---|---|---|---|
| $L_1$ | 1.71-1.76 | $R_1=65-77$<br>$R_2=-145--220$ | $T_1=12-18$<br>$S_1=.1-3$ |
| $L_2$ | 1.65-1.71 | $R_3=45-50$<br>$R_4=100-160$ | $T_2=4-7$<br>$S_2=2-5$ |
| $L_3$ | 1.67-1.70 | $R_5=-250-1,000$<br>$R_6=32-34$ | $T_3=10-11$<br>$S_3=10-12$ |
| $L_4$ | 1.61-1.63 | $R_7=-33-38$<br>$R_8=240-310$ | $T_4=8-13$<br>$S_4=2-8$ |
| $L_5$ | 1.69-1.71 | $R_9=-130-155$<br>$R_{10}=-50-52$ | $T_5=4.5-5$<br>$S_5=.1-2$ |
| $L_6$ | 1.68-1.72 | $R_{11}=130-210$<br>$R_{12}=-35-38$ | $T_6=10-11$ |
| $L_7$ | 1.61-1.64 | $R_{13}=-70-115$ | $T_7=1-6$ |

2. An optical objective comprising in spaced optical alignment two inner negative components on opposite sides of a centrally located diaphragm, and two outer positive components, said inner components each including an inner biconcave element airspaced from an outer meniscus element concave toward the diaphragm, said front positive component being a simple biconvex element, said rear positive component being a biconvex doublet with a cemented surface concave toward the diaphragm, wherein the elements are constructed substantially according to the following parameters for the lens at an equivalent focal length of 100 mm. in which the lens elements are numbered from the front, N is the index of refraction for the D line of the spectrum and R, T and S refer respectively to the radii of curvature of the lens surfaces, the axial thicknesses of the lens elements and the axial spacings between the lens elements numbered by subscript from front to rear:

| Elements | N | Radii (mm.) | Thicknesses and spacings (mm.) |
|---|---|---|---|
| $L_1$ | 1.73 | $R_1=76.58$ | $T_1=14.87$ |
|  |  | $R_2=-215.56$ | $S_1=.33$ |
| $L_2$ | 1.65 | $R_3=45.79$ | $T_2=6.27$ |
|  |  | $R_4=101.59$ | $S_2=4.49$ |
| $L_3$ | 1.69 | $R_5=-996.05$ | $T_3=10.81$ |
|  |  | $R_6=33.71$ | $S_3=10.90$ |
| $L_4$ | 1.62 | $R_7=-35.85$ | $T_4=9.84$ |
|  |  | $R_8=242.31$ | $S_4=2.05$ |
| $L_5$ | 1.70 | $R_9=-153.34$ | $T_5=4.08$ |
|  |  | $R_{10}=-51.40$ | $S_5=.15$ |
| $L_6$ | 1.72 | $R_{11}=135.43$ | $T_6=10.88$ |
| $L_7$ | 1.61 | $R_{12}=-36.40$ | $T_7=5.19$ |
|  |  | $R_{13}=-93.52$ |  |

4. An optical objective comprising in spaced optical alignment two inner negative components on opposite sides of a centrally located diaphragm, and two outer positive components, said inner components each including an inner biconcave element airspaced from an outer meniscus element concave toward the diaphragm, said front positive component being a simple biconvex element, said rear positive component being a biconvex doublet with a cemented surface concave toward the diaphragm, wherein the elements are constructed substantially according to the following parameters for the lens at an equivalent focal length of 100 mm. in which the lens elements are numbered from the front, N is the index of refraction for the D line of the spectrum and R, T and S refer respectively to the radii of curvature of the lens surfaces, the axial thicknesses of the lens elements and the axial spacings between the lens elements numbered by subscript from front to rear:

| Elements | N | Radii (mm.) | Thicknesses and spacings (mm.) |
|---|---|---|---|
| $L_1$ | 1.76 | $R_1=66.30$ | $T_1=17.42$ |
|  |  | $R_2=-192.96$ | $S_1=2.23$ |
| $L_2$ | 1.66 | $R_3=46.05$ | $T_2=4.70$ |
|  |  | $R_4=108.97$ | $S_2=2.36$ |
| $L_3$ | 1.70 | $R_5=-352.51$ | $T_3=10.06$ |
|  |  | $R_6=33.51$ | $S_3=10.92$ |
| $L_4$ | 1.62 | $R_7=-33.29$ | $T_4=12.15$ |
|  |  | $R_8=252.60$ | $S_4=2.18$ |
| $L_5$ | 1.70 | $R_9=-133.01$ | $T_5=4.63$ |
|  |  | $R_{10}=-50.70$ | $S_5=.51$ |
| $L_6$ | 1.68 | $R_{11}=138.25$ | $T_6=10.95$ |
| $L_7$ | 1.62 | $R_{12}=-37.75$ | $T_7=1.41$ |
|  |  | $R_{13}=-73.38$ |  |

3. An optical objective comprising in spaced optical alignment two inner negative components on opposite sides of a centrally located diaphragm, and two outer positive components, said inner components each including an inner biconcave element airspaced from an outer meniscus element concave toward the diaphragm, said front positive component being a simple biconvex element, said rear positive component being a biconvex doublet with a cemented surface concave toward the diaphragm, wherein the elements are constructed substantially according to the following parameters for the lens at an equivalent focal length of 100 mm. in which the lens elements are numbered from the front, N is the index of refraction for the D line of the spectrum, and R, T and S refer respectively to the radii of curvature of the lens surfaces, the axial thicknesses of the lens elements and the axial spacings between the lens elements numbered by subscript from front to rear:

| Elements | N | Radii (mm.) | Thicknesses and spacings (mm.) |
|---|---|---|---|
| $L_1$ | 1.71 | $R_1=65.11$ | $T_1=12.84$ |
|  |  | $R_2=-146.65$ | $S_1=.14$ |
| $L_2$ | 1.71 | $R_3=49.16$ | $T_2=5.12$ |
|  |  | $R_4=153.74$ | $S_2=2.17$ |
| $L_3$ | 1.67 | $R_5=-250.53$ | $T_3=10.72$ |
|  |  | $R_6=32.11$ | $S_3=11.34$ |
| $L_4$ | 1.62 | $R_7=-37.64$ | $T_4=8.55$ |
|  |  | $R_8=308.53$ | $S_4=7.57$ |
| $L_5$ | 1.70 | $R_9=-139.36$ | $T_5=4.76$ |
|  |  | $R_{10}=-51.25$ | $S_5=1.74$ |
| $L_6$ | 1.71 | $R_{11}=203.18$ | $T_6=11.00$ |
| $L_7$ | 1.64 | $R_{12}=-35.50$ | $T_7=1.38$ |
|  |  | $R_{13}=-111.72$ |  |

References Cited
UNITED STATES PATENTS
2,878,723 3/1959 Herzberger.
2,887,009 5/1959 Altman et al.

DAVID SCHONBERG, Primary Examiner

P. A. SACHER, Assistant Examiner

U.S. Cl. X.R.

350—209, 221